United States Patent
Zhu

(10) Patent No.: US 9,471,408 B2
(45) Date of Patent: Oct. 18, 2016

(54) METHOD, NODE AND SYSTEM FOR DETERMINING FAULT INDICATION STATE

(71) Applicant: Huawei Technologies Co., Ltd., Shenzhen, Guangdong (CN)

(72) Inventor: Zhiyong Zhu, Beijing (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 412 days.

(21) Appl. No.: 14/087,880

(22) Filed: Nov. 22, 2013

(65) Prior Publication Data

US 2014/0082432 A1    Mar. 20, 2014

Related U.S. Application Data

(63) Continuation of application No. PCT/CN2011/074888, filed on May 30, 2011.

(51) Int. Cl.
| | |
|---|---|
| G06F 11/00 | (2006.01) |
| G06F 11/30 | (2006.01) |
| H04L 12/26 | (2006.01) |
| H04W 24/04 | (2009.01) |
| H04W 24/08 | (2009.01) |

(52) U.S. Cl.
CPC ......... *G06F 11/008* (2013.01); *G06F 11/3006* (2013.01); *H04L 43/0817* (2013.01); *H04L 43/10* (2013.01); *H04W 24/04* (2013.01); *H04W 24/08* (2013.01)

(58) Field of Classification Search
CPC ............. G06F 11/008; G06F 11/0712; G06F 11/3006; H04W 24/04; H04W 24/08; H04L 43/0817; H04L 43/10

USPC ........................ 714/4.1, 4.2, 4.21, 43, 48, 57
See application file for complete search history.

(56) References Cited

U.S. PATENT DOCUMENTS

| | | | | |
|---|---|---|---|---|
| 7,228,460 | B2* | 6/2007 | Pomaranski | H04L 41/0668 714/43 |
| 7,281,172 | B2* | 10/2007 | Chujo | H04L 12/2602 714/45 |
| 2004/0255185 | A1* | 12/2004 | Fujiyama | G06F 11/1482 714/4.1 |
| 2005/0050398 | A1 | 3/2005 | Rao et al. | |
| 2010/0205481 | A1* | 8/2010 | Zheng | H04L 41/0677 714/4.1 |

(Continued)

FOREIGN PATENT DOCUMENTS

| | | |
|---|---|---|
| CN | 1728658 A | 2/2006 |
| CN | 1859273 A | 11/2006 |
| CN | 101047546 A | 10/2007 |

(Continued)

*Primary Examiner* — Joseph D Manoskey
(74) *Attorney, Agent, or Firm* — Leydig, Voit & Mayer, Ltd.

(57) ABSTRACT

Receiving results of detecting whether each service node in a service node pool is faulty transmitted by service request nodes; and determining fault indication states of a service node itself and other service nodes according to the results of detecting; or expanding an echo request message which carries a result of detecting, by a service request node itself, whether each service node in a service node pool is faulty during a previous period to a current period; and transmitting the echo request message to each service node at the beginning of the current period to enable each service node to determine fault indication states of a service node itself and other service nodes according to the result of detecting. According to the foregoing solutions of the present invention, reliability of service node fault detection is improved.

20 Claims, 5 Drawing Sheets

(56) References Cited

U.S. PATENT DOCUMENTS

2010/0260041 A1 10/2010 Yan et al.
2012/0106358 A1* 5/2012 Mishra ............... H04L 43/0817
                                                            370/242

FOREIGN PATENT DOCUMENTS

| CN | 101207408 A | 6/2008 |
| CN | 101459549 A | 6/2009 |
| JP | 61131933 A | 6/1986 |

* cited by examiner

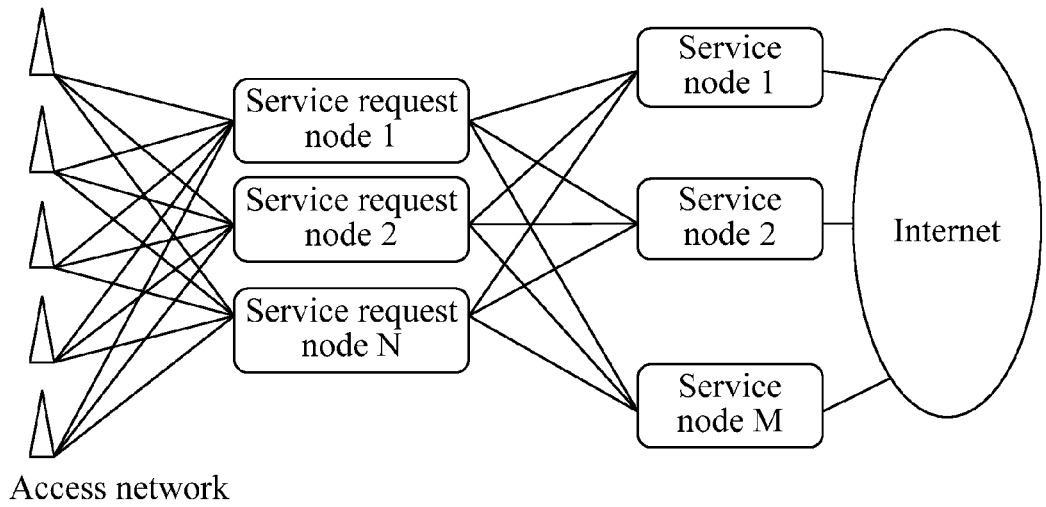
FIG. 1
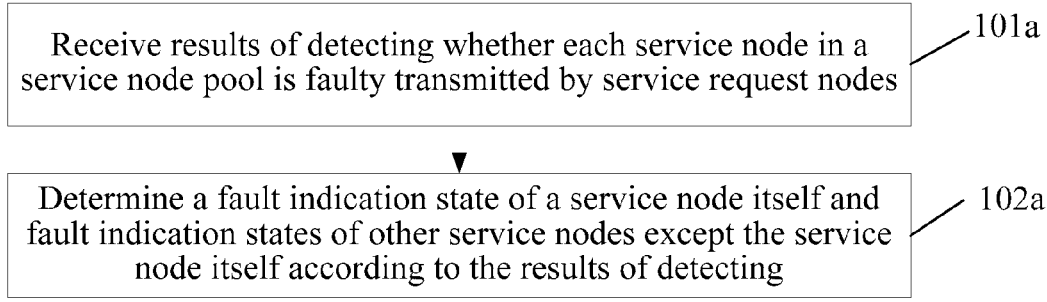
FIG. 2-a
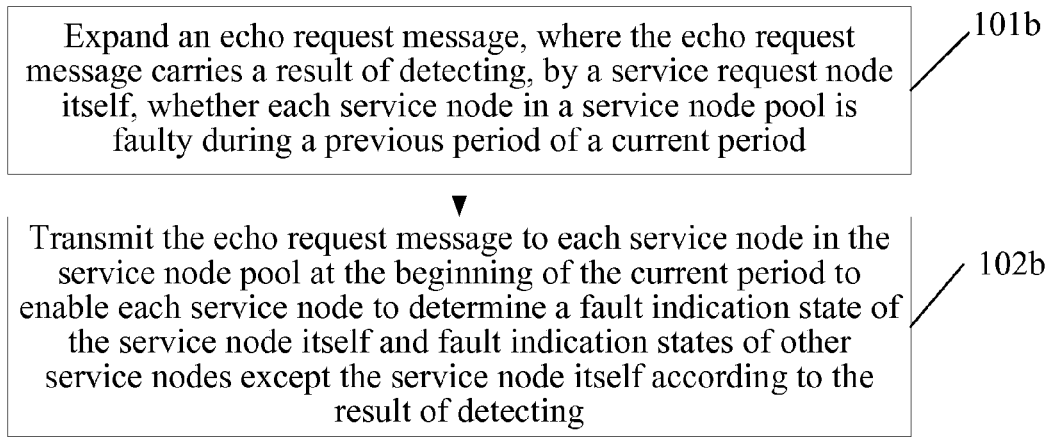
FIG. 2-b

METHOD, NODE AND SYSTEM FOR DETERMINING FAULT INDICATION STATE

CROSS-REFERENCE TO RELATED APPLICATIONS

This application is a continuation of International Patent Application No. PCT/CN2011/074888, filed on May 30 2011, which is hereby incorporated by reference in its entirety.

TECHNICAL FIELD

The present invention relates to the field of communications, and in particular, to a method, node, and system for determining a fault indication state.

BACKGROUND

In a communications network, in order to improve reliability of network communications or increase a processing capability of a network node, multiple communication nodes are usually deployed on network planes at a same level on a communication path. After one of the communication nodes is faulty, failover behavior and network resource preemption behavior of other communication nodes at the same level are triggered. Therefore, how to detect a communication node fault becomes an important problem to be solved.

In a GPRS (General Packet Radio Service, general packet radio service) or UMTS (Universal Mobile Telecommunications System, universal mobile telecommunications system) network, a fault state of a peer GGSN is detected through a Hello message between GGSNs (Gateway GPRS Support Node, gateway GPRS support node); if no response packet is received within a specified duration, a transmitting GGSN thinks that the peer GGSN is faulty, thereby triggering service switchover and network resource preemption behavior.

In a process of implementing the present invention, the inventor finds that the prior art has at least the following problem:

According to an existing fault detection method, if a communication link between two GGSNs is interrupted, the two GGSNs both think that a peer end is faulty; but actually, the two GGSNs may both be normal. Therefore, in the existing fault detection method, a misjudgment may exist.

SUMMARY

In order to improve reliability of fault detection, embodiments of the present invention provide a method, node, and system for determining a fault indication state. The technical solutions are as follows:

A method for determining a fault indication state includes:
receiving results of detecting whether each service node in a service node pool is faulty transmitted by service request nodes; and
determining a fault indication state of a service node itself and fault indication states of other service nodes except the service node itself according to the results of detecting.

A method for determining a fault indication state includes:
expanding an echo request message, where the echo request message carries a result of detecting, by a service request node itself, whether each service node in a service node pool is faulty during a previous period to a current period; and
transmitting the echo request message to each service node in the service node pool at the beginning of the current period to enable each service node to determine a fault indication state of the service node itself and fault indication states of other service nodes except the service node itself according to the result of detecting.

A service node includes:
a receiver, configured to receive results of detecting whether each service node in a service node pool is faulty transmitted by service request nodes; and
a determiner, configured to determine a fault indication state of the service node itself and fault indication states of other service nodes except the service node itself according to the results of detecting.

A service request node includes:
an expander, configured to expand an echo request message, where the echo request message carries a result of detecting, by the service request node itself, whether each service node in a service node pool is faulty during a previous period to a current period; and
a transmitter, configured to transmit the echo request message to each service node in the service node pool at the beginning of the current period to enable each service node to determine a fault indication state of the service node itself and fault indication states of other service nodes except the service node itself according to the result of detecting.

A system for determining a fault indication state includes:
a service request node and service nodes in a service node pool, where
the service request node includes an expander and a transmitter:
the expander is configured to expand an echo request message, where the echo request message carries a result of detecting, by the service request node itself, whether each of the service nodes in the service node pool is faulty during a previous period to a current period; and
the transmitter is configured to transmit the echo request message to each of the service nodes in the service node pool at the beginning of the current period to enable each of the service nodes to determine a fault indication state of the service node itself and fault indication states of other service nodes except the service node itself according to the result of detecting;
each of the service nodes includes a receiver and a determiner:
the receiver is configured to receive the echo request message transmitted by the service request node, where the echo request message carries the result of detecting, by the service request node, whether each of the service nodes in the service node pool is faulty during the previous period to the current period; and
the determiner is configured to determine the fault indication state of the service node itself and the fault indication states of the other service nodes except the service node itself according to the result of detecting.

The technical solutions provided by the embodiments of the present invention have the following beneficial effects: A service request node detects whether a service node is faulty, and fault indication states of the service node itself and other service nodes are determined according to a result of detecting of the service request node for the service node, which improves reliability of service node fault detection.

BRIEF DESCRIPTION OF DRAWINGS

FIG. 1 is a schematic diagram of an N×M interconnected network architecture according to an embodiment of the present invention;

FIG. 2-*a* is a flow chart of a method for determining a fault indication state according to Embodiment 1 of the present invention;

FIG. 2-*b* is a flow chart of a method for determining a fault indication state according to Embodiment 1 of the present invention;

DESCRIPTION OF EMBODIMENTS

Figure 3:
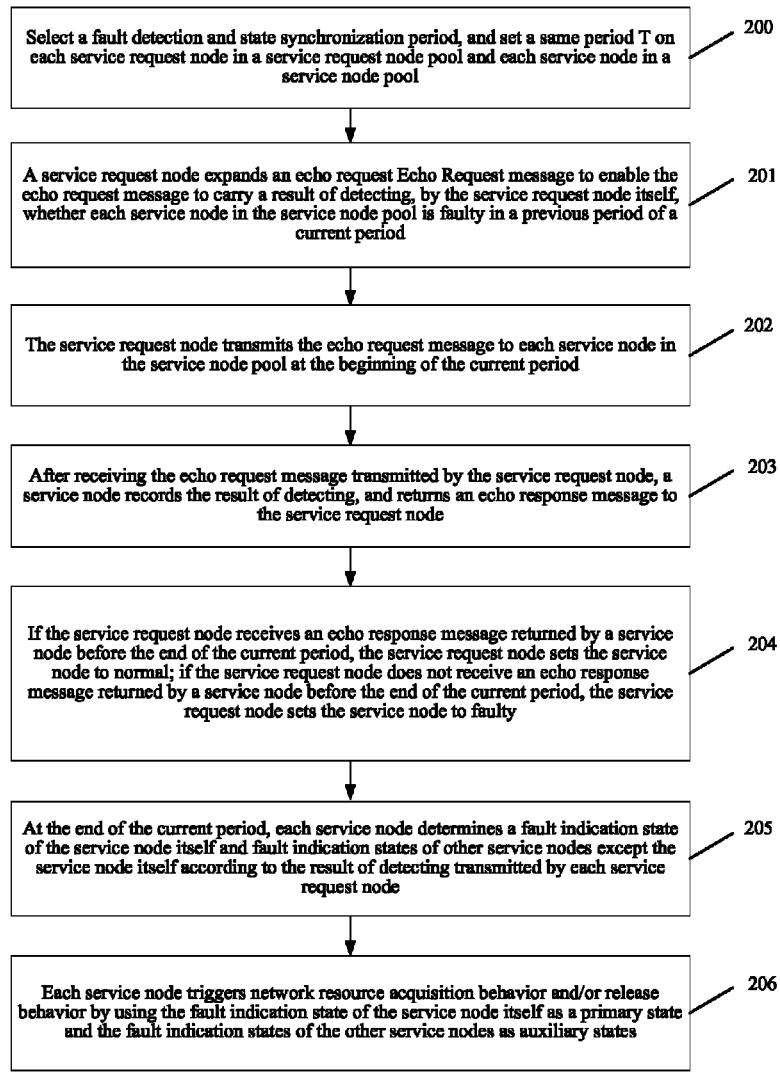
FIG. 3 is a flow chart of a method for determining a fault indication state according to Embodiment 2 of the present invention.

To make the objectives, technical solutions, and advantages of the present invention clearer, the following further describes implementation manners of the present invention in detail with reference to the accompanying drawings.

The technical solutions provided by the embodiments of the present invention apply to an N×M interconnected network architecture formed of N service request nodes and M service nodes, where N is greater than or equal to 1, and M is greater than or equal to 1. Referring to a schematic diagram of an N×M interconnected network architecture shown in FIG. 1, M service nodes form a service node pool, and N service request nodes form a service request node pool; each service node in the service node pool is interconnected to each service request node in the service request node pool as a complete mesh through an IP backbone network. The service nodes in the service node pool are at equivalent network positions and have same functions; sometimes the service nodes share some network resources, such as an IP address pool resource, according to a configuration of an operator, and sometimes they back up services for each other. When one of the service nodes is faulty, other service nodes that are running normally preempt a network resource of the faulty service node, or take over a service borne by the faulty service node. In a GPRS network or a UMTS network, relative to a GGSN, an SGSN (Serving GPRS Support Node, serving GPRS support node) is a service requester, and relative to the SGSN, the GGSN is a service provider. Therefore, in the GPRS network or the UMTS network, a service node involved in the embodiments is a GGSN, and a service request node is an SGSN. In an LTE (Long Term Evolution, long term evolution)-SAE (System Architecture Evolution, system architecture evolution) network architecture, an initiating direction of a service is always pointing to a Serving GW (Serving GateWay, serving gateway) from an MME (mobility management entity). Therefore, relatively speaking, the MME is a service request node, and the Serving GW is a service node; for a Serving GW and a PDN GW (Packet Data Network, packet data network gateway), the Serving GW is a service request node, and the PDN GW is a service node.

The technical solutions of the present invention are described in detail in the following based on the N×M interconnected network architecture.

Embodiment 1

Referring to FIG. 2-*a*, this embodiment provides a method for determining a fault indication state, where this method may be implemented by a service node, and the method includes:

101*a*: Receive results of detecting whether each service node in a service node pool is faulty transmitted by service request nodes.

102*a*: Determine a fault indication state of a service node itself and fault indication states of other service nodes except the service node itself according to the results of detecting.

In this embodiment, results of detecting whether each service node in a service node pool is faulty transmitted by service request nodes are received, and a fault indication state of a service node itself and fault indication states of other service nodes except the service node itself are determined according to the results of detecting, which improves reliability of service node fault detection.

Referring to FIG. 2-*b*, this method may be implemented by a service request node, and the method includes:

101*b*: Expand an echo request message, where the echo request message carries a result of detecting, by a service request node itself, whether each service node in a service node pool is faulty during a previous period to a current period.

102*b*: Transmit the echo request message to each service node in the service node pool at the beginning of the current period to enable each service node to determine a fault indication state of the service node itself and fault indication states of other service nodes except the service node itself according to the result of detecting.

In this embodiment, an echo request message is expanded, so that the echo request message carries a result of detecting, by a service request node itself, whether each service node in a service node pool is faulty during a previous period to a current period, and the echo request message is transmitted to each service node in the service node pool to enable each service node to determine a fault indication state of the service node itself and fault indication states of other service nodes except the service node itself according to the result of detecting, which improves reliability of service node fault detection.

Embodiment 2

This embodiment provides a method for determining a fault indication state.

Referring to FIG. 3, the method includes:

200: Select a fault detection and state synchronization period (which is referred to as period for short, and is set to T), and set a same period T on each service request node in a service request node pool and each service node in a service node pool.

Steps 201-204 are implemented on each service request node in the service request node pool:

201: A service request node expands an echo request Echo Request message to enable the echo request message to carry a result of detecting, by the service request node itself, whether each service node in the service node pool is faulty during a previous period (which is set to a period $T_1$) to a current period.

Further, if the current period is a first period, the echo request message may carry an initialized state of each service node in the service node pool, for example, a state of each service node may be initialized to faulty.

A method for the service request node itself to detect whether each service node in the service node pool is faulty during the previous period to the current period is as follows:

The service request node itself transmits an echo request message to all service nodes in the service node pool at the beginning of the period $T_1$; if the service request node itself receives an echo response Echo Response message returned by a service node before the end of the period $T_1$, the service request node itself sets the service node to normal; on the contrary, if the service request node itself does not receive an echo response message returned by a service node before the end of the period $T_1$, the service request node itself sets the service node to faulty. The echo request message may carry a result of detecting, by the service request node itself, whether each service node in the service node pool is faulty during a previous period to the period $T_1$.

A method for the service request node to expand the echo request Echo Request message is as follows:

The service request node utilizes an idle bit of the echo request message or adds a new bit, where each bit represents whether a service node is faulty. For example, in an Echo Request (GGSN_states:0000 0111), a $0^{th}$ bit represents a state of a GGSN-1, a $1^{st}$ bit represents a state of a GGSN-2, and a $2^{nd}$ bit represents a state of a GGSN-3. For a GGSN, if a bit corresponding to a GGSN is 1, it indicates that it is detected that the GGSN is normal, and if a bit corresponding to a GGSN is 0, it indicates that it is detected that the GGSN is faulty.

202: The service request node transmits the echo request message to each service node in the service node pool at the beginning of the current period (which is set to a period $T_2$).

203: After receiving the echo request message transmitted by the service request node, a service node records the result of detecting, and returns an echo response message to the service request node.

204: If the service request node receives an echo response message returned by a service node before the end of the current period, the service request node sets the service node to normal; on the contrary, if the service request node does not receive an echo response message returned by a service node before the end of the current period, the service request node sets the service node to faulty.

205: At the end of the current period, each service node determines a fault indication state of the service node itself and fault indication states of other service nodes except the service node itself according to the result of detecting transmitted by each service request node.

Specifically, that a service node determines fault indication states of other service nodes except the service node itself according to the result of detecting transmitted by each service request node includes at least one of the following situations:

if a result of detecting transmitted by at least one service request nodes and received in the current period indicates that a service node A among the other service nodes is normal, setting a fault indication state of the service node A to normal;

if results of detecting transmitted by all service request nodes and received in the current period indicate that a service node B among the other service nodes is faulty, setting a fault indication state of the service node B to faulty; and if results of detecting transmitted by a part of service request nodes are received in the current period and the results of detecting transmitted by the part of the service request nodes indicate that a service node C among the other service nodes is faulty, setting a fault indication state of the service node C to uncertain.

It should be noted that, the service node A, the service node B, or the service node C in this embodiment does not specifically refer to a certain node, but refers to a type of nodes of which results of detecting satisfy defined features of this embodiment.

Specifically, that a service node determines a fault indication state of the service node itself according to the result of detecting transmitted by each service request node includes at least one of the following situations:

if a result of detecting transmitted by at least one service request node and received in the current period indicates that the service node itself is normal, setting the fault indication state of the service node itself to normal; and if no result of detecting transmitted by any service request node is received in the current period, or if all results of detecting transmitted by the service request nodes and received in the current period indicate that the service node itself is faulty, setting the fault indication state of the service node itself to abnormal.

Figure 4:
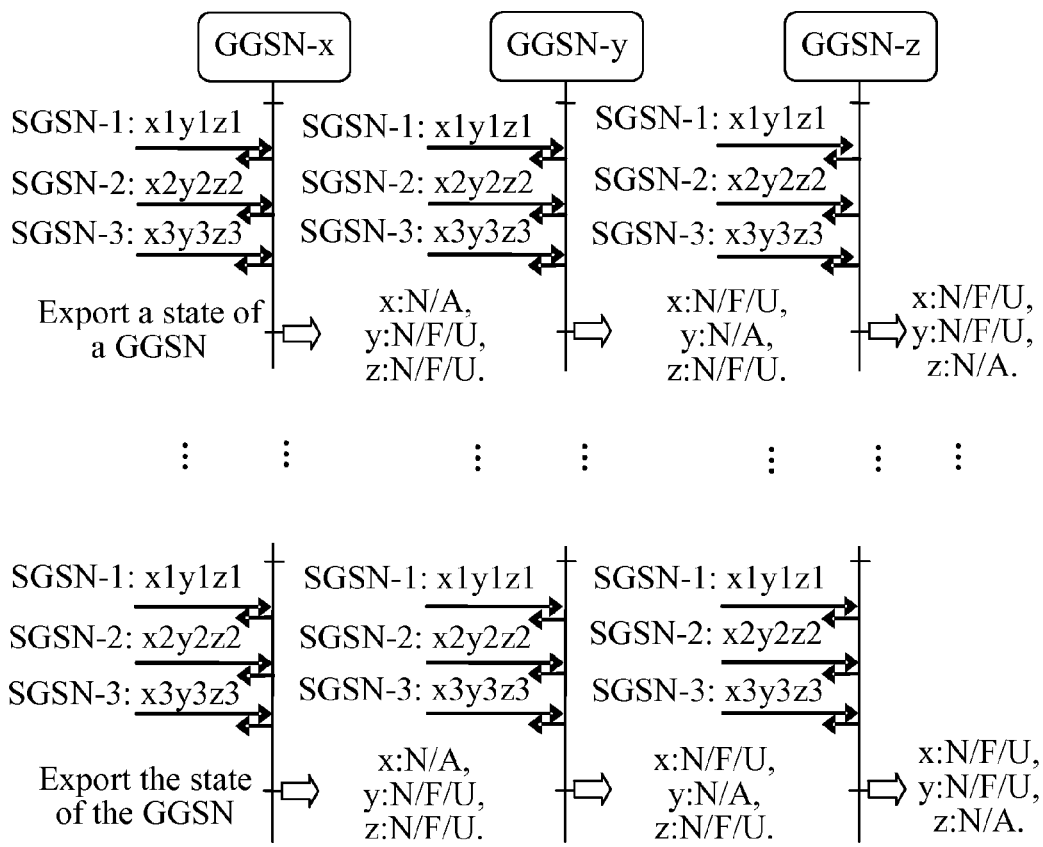
FIG. 4 is a schematic flow chart of determining a fault indication state according to Embodiment 2 of the present invention.

For vivider description of this step, refer to a schematic flow chart of determining a fault indication state shown in FIG. 4, where SGSN-1: x1y1z1 represents that fault detection results of a service request node SGSN-1 for a service node GGSN-x, a service node GGSN-y, and a service node GGSN-z are x1, y1, and z1 respectively; SGSN-2: x2y2z2 represents that fault detection results of a service request node SGSN-2 for the service node GGSN-x, the service node GGSN-y, and the service node GGSN-z are x2, y2, and z2 respectively; SGSN-3: x3y3z3 represents that fault detection results of a service request node SGSN-3 for the service node GGSN-x, the service node GGSN-y, and the service node GGSN-z are x3, y3, and z3 respectively. SGSN-1: x1y1z1, SGSN-2: x2y2z2, and SGSN-3: x3y3z3 are transmitted to the GGSN-x, the GGSN-y, and the GGSN-z respectively; the GGSN-x, the GGSN-y, and the GGSN-z obtain fault indication states of the service node itself and other service nodes according to SGSN-1: x1y1z1, SGSN-2: x2y2z2, and SGSN-3: x3y3z3 respectively. x:N/A represents the fault indication state of the GGSN-x; y:N/F/U represents the fault indication state of the GGSN-y; and z:N/F/U represents the fault indication state of the GGSN-z; N stands for normal, A stands for abnormal, F stands for faulty, and U stands for uncertain.

Optionally, step 206 may be further implemented after step 205:

206: Each service node triggers network resource acquisition behavior and/or release behavior by using the fault indication state of the service node itself as a primary state and the fault indication states of the other service nodes as auxiliary states.

Figure 5:
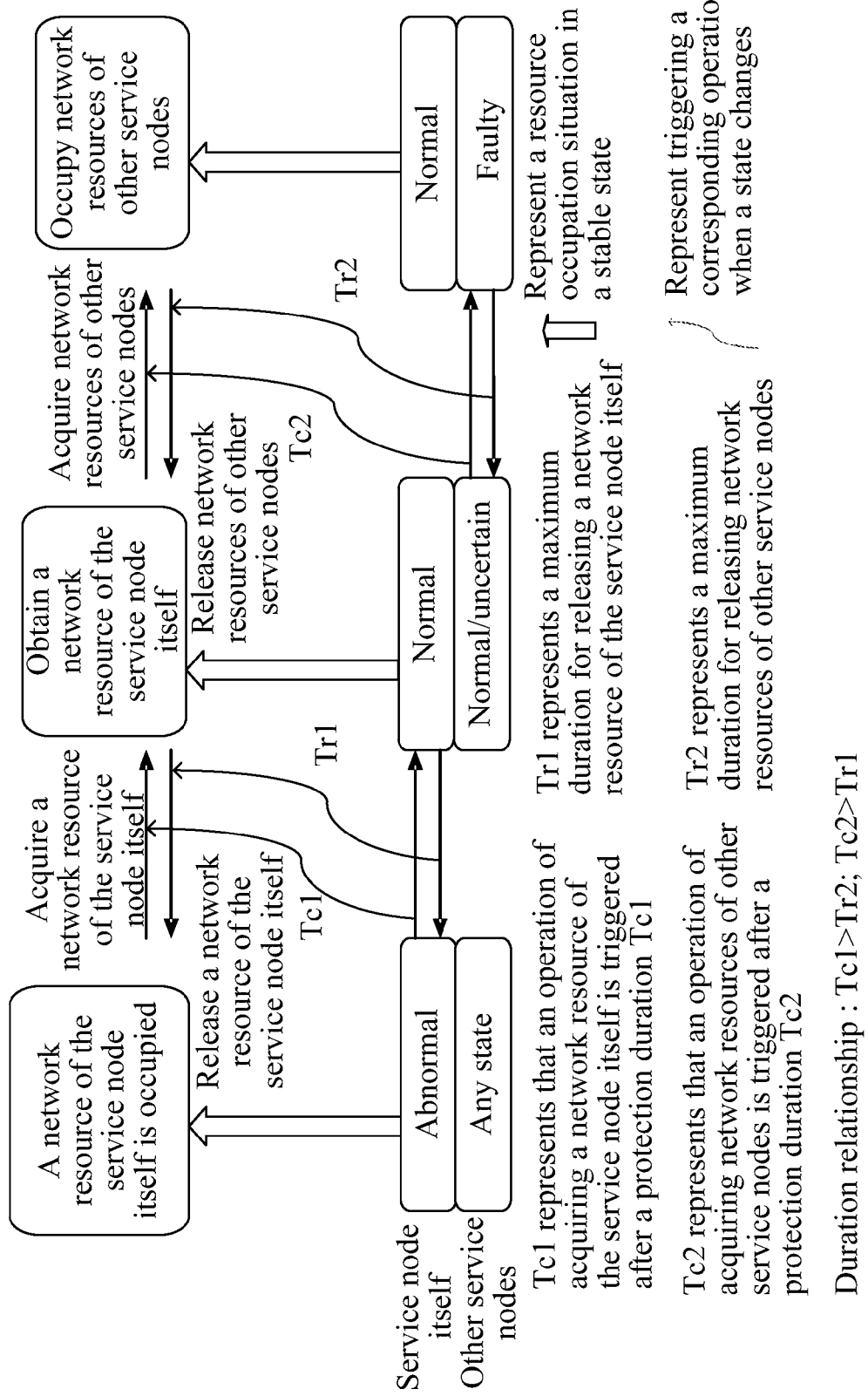
FIG. 5 is a schematic diagram of behavior triggering and behavior time sequence control according to Embodiment 2 of the present invention.

Referring to a schematic diagram of behavior triggering and behavior time sequence control shown in FIG. 5, this step specifically includes:

when the fault indication state of the service node itself changes from abnormal to normal, triggering, after a preset first protection duration (which is set to Tc1), an operation of acquiring a network resource of the service node itself; when the fault indication state of the service node itself changes from normal to abnormal, triggering an operation of releasing a network resource of the service node itself, and completing release of the network resource of the service node itself within a preset second duration (which is set to Tr1);

when the fault indication state of the service node itself is normal, if a fault indication state of a service node D among the other service nodes changes from normal to faulty, triggering, after a preset third protection duration (which is set to Tc2), an operation of acquiring a network resource of the service node D; and when the fault indication state of the service node itself is normal, if a fault indication state of a service node E among the other service nodes changes from faulty to normal or uncertain, triggering an operation of releasing a network resource of the service node E, and completing release of the network resource of the service node E within a preset fourth duration (which is set to Tr2), where the first protection duration is greater than the fourth duration, and the third protection duration is greater than the second duration.

It should be noted that, the service node D or the service node E in this embodiment does not specifically refer to a certain node, but refers to a type of nodes of which results of detecting satisfy defined features of this embodiment.

A fault means incapability to provide a service. Therefore, from the perspective of a service request node, whether a service node is faulty has a same meaning as whether a service node can provide a service for a service request node. Therefore, in this embodiment, a service request node detects whether a service node is faulty, and notifies the service node of a result of detecting, which, as compared with that service nodes detect whether a peer end is faulty between each other, eliminates possibility of a state misjudgment (or eliminates ambiguity in comprehension of a fault) and improves reliability of service node fault detection. For example, if a communication link between two GGSNs is interrupted, according to an existing technical solution, the two GGSNs both think that the peer end is faulty; according to the technical solution of this embodiment, a service request node checks whether a GGSN can still provide a service, if the GGSN can provide a service, it may be concluded that the GGSN is normal, and if the GGSN cannot provide a service, it is concluded that the GGSN is faulty. Therefore, according to the technical solution of this embodiment, reliability of fault detection is higher. When there are multiple service request nodes, a service node may comprehensively determine fault indication states of the service node itself and other service nodes according to results of detecting of the multiple service request nodes, thereby further improving the reliability of service node fault detection. In addition, this embodiment further defines complete behavior triggering and behavior time sequence control logic, which may avoid conflict between network behavior such as network resource acquisition and/or release.

Embodiment 3

Figure 6:
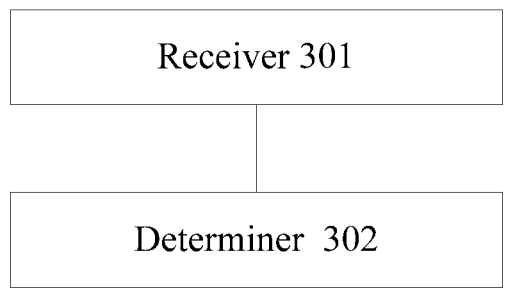
FIG. 6 is a schematic structural diagram of a service node according to Embodiment 3 of the present invention.

Referring to FIG. 6, this embodiment provides a service node, including:

a receiver 301, configured to receive results of detecting whether each service node in a service node pool is faulty transmitted by service request nodes; and a determiner 302, configured to determine a fault indication state of the service node itself and fault indication states of other service nodes except the service node itself according to the results of detecting.

The receiver 301 is configured to:

receive, during a current period, echo request messages transmitted by the service request nodes, where the echo request messages carry the results of detecting, by the service request nodes, whether each service node in the service node pool is faulty during a previous period to the current period.

That the determiner 302 is configured to determine fault indication states of other service nodes except the service node itself according to the results of detecting includes at least one of the following situations:

if a result of detecting transmitted by at least one of the service request nodes and received in the current period indicates that a service node A among the other service nodes is normal, setting a fault indication state of the service node A to normal;

if results of detecting transmitted by all of the service request nodes and received in the current period indicate that a service node B among the other service nodes is faulty, setting a fault indication state of the service node B to faulty; and if results of detecting transmitted by a part of the service request nodes are received in the current period and the results of detecting transmitted by the part of the service request nodes indicate that a service node C among the other service nodes is faulty, setting a fault indication state of the service node C to uncertain.

That the determiner 302 is configured to determine a fault indication state of a service node itself according to the results of detecting includes at least one of the following situations:

if a result of detecting transmitted by at least one of the service request nodes and received in the current period indicates that the service node itself is normal, setting the fault indication state of the service node itself to normal; and if no result of detecting transmitted by any of the service request nodes is received in the current period, or if all of the results of detecting transmitted by the service request nodes and received in the current period indicate that the service node itself is faulty, setting the fault indication state of the service node itself to abnormal.

The service node further includes:

a trigger, configured to, after the determiner is executed, trigger network resource acquisition behavior and/or release behavior by using the fault indication state of the service node itself as a primary state and the fault indication states of the other service nodes as auxiliary states.

The trigger is configured to implement at least one of the following situations:

when the fault indication state of the service node itself changes from abnormal to normal, triggering, after a preset first protection duration, an operation of acquiring a network resource of the service node itself; when the fault indication state of the service node itself changes from normal to abnormal, triggering an operation of releasing a network resource of the service node itself, and completing release of the network resource of the service node itself within a preset second duration;

when the fault indication state of the service node itself is normal, if a fault indication state of a service node D among the other service nodes changes from normal to faulty, triggering, after a preset third protection duration, an operation of acquiring a network resource of the service node D; and when the fault indication state of the service node itself is normal, if a fault indication state of a service node E among the other service nodes changes from faulty to normal or uncertain, triggering an operation of releasing a network resource of the service node E, and completing release of the network resource of the service node E within a preset fourth duration;

where the first protection duration is greater than the fourth duration, and the third protection duration is greater than the second duration.

The service node provided in this embodiment and the service node in the method embodiment belong to a same concept. For its specific process, reference may be made to the method embodiment, and details are not repeatedly described herein.

In this embodiment, results of detecting whether each service node in a service node pool is faulty transmitted by service request nodes are received, and a fault indication state of the service node itself and fault indication states of other service nodes except the service node itself are determined according to the results of detecting, which improves reliability of service node fault detection. When there are multiple service request nodes, a service node may comprehensively determine fault indication states of the service node itself and other service nodes according to results of detecting of the multiple service request nodes, thereby further improving the reliability of service node fault detection. In addition, this embodiment further defines complete behavior triggering and behavior time sequence control logic, which may avoid conflict between network behavior.

Embodiment 4

Figure 7:
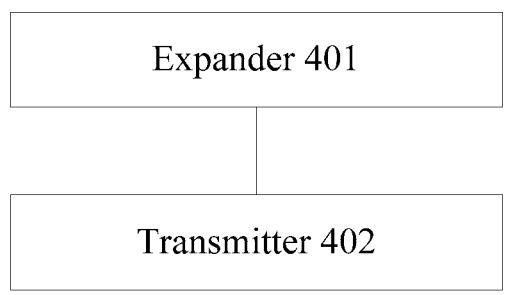
FIG. 7 is a schematic structural diagram of a service request node according to Embodiment 4 of the present invention.

Referring to FIG. 7, this embodiment provides a service request node, including:

an expander 401, configured to expand an echo request message, where the echo request message carries a result of detecting, by the service request node itself, whether each service node in a service node pool is faulty during a previous period to a current period; and a transmitter 402, configured to transmit the echo request message to each service node in the service node pool at the beginning of the current period to enable each service node to determine a fault indication state of the service node itself and fault indication states of other service nodes except the service node itself according to the result of detecting.

The expander 401 is configured to:

utilize idle bits of the echo request message, where each of the idle bits represents whether a service node in the service node pool is faulty;

or, add new bits in the echo request message, where each of the new bits represents whether a service node in the service node pool is faulty.

The service request node provided in this embodiment and the service request node in the method embodiment belong to a same concept. For its specific process, reference may be made to the method embodiment, and details are not repeatedly described herein.

In this embodiment, an echo request message is expanded, so that the echo request message carries a result of detecting, by the service request node itself, whether each service node in a service node pool is faulty during a previous period to a current period, and the echo request message is transmitted to each service node in the service node pool to enable each service node to determine a fault indication state of the service node itself and fault indication states of other service nodes except the service node itself according to the result of detecting, which improves reliability of service node fault detection. When there are multiple service request nodes, a service node may comprehensively determine fault indication states of the service node itself and other service nodes according to results of detecting of the multiple service request nodes, thereby further improving the reliability of service node fault detection.

Embodiment 5

Figure 8:
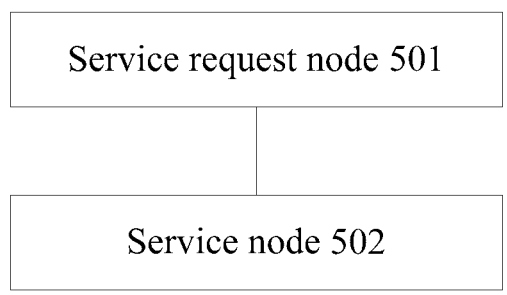
FIG. 8 is a schematic structural diagram of a system for determining a fault indication state according to Embodiment 5 of the present invention.

Referring to FIG. 8, this embodiment provides a system for determining a fault indication state, where the system includes a service request node 501 and service nodes 502 in a service node pool.

The service request node 501 includes an expander 401 and a transmitter 402.

The expander 401 is configured to expand an echo request message, where the echo request message carries a result of detecting, by the service request node itself, whether each of the service nodes in the service node pool is faulty during a previous period to a current period.

The transmitter 402 is configured to transmit the echo request message to each of the service nodes in the service node pool at the beginning of the current period to enable each of the service nodes to determine a fault indication state of the service node itself and fault indication states of other service nodes except the service node itself according to the result of detecting.

Each of the service nodes 502 includes a receiver 301 and a determiner 302.

The receiver 301 is configured to receive the echo request message transmitted by the service request node, where the echo request message carries the result of detecting, by the service request node, whether each of the service nodes in the service node pool is faulty during the previous period to the current period.

The determiner 302 is configured to determine the fault indication state of the service node itself and the fault indication states of the other service nodes except the service node itself according to the result of detecting.

The service request node and the service node provided in this embodiment and the service request node and the service node in the method embodiment belong to a same concept. For their specific processes, reference may be made to the method embodiment, and details are not repeatedly described herein.

In this embodiment, an echo request message is expanded, so that the echo request message carries a result of detecting, by a service request node itself, whether each of service nodes in a service node pool is faulty during a previous period to a current period, and the echo request message is transmitted to each of the service nodes in the service node pool to enable each of the service nodes to determine a fault indication state of the service node itself and fault indication states of other service nodes except the service node itself according to the result of detecting, which improves reliability of service node fault detection. When there are multiple service request nodes, a service node may comprehensively determine fault indication states of the service node itself and other service nodes according to results of detecting of the multiple service request nodes, thereby further improving the reliability of service node fault detection.

A person of ordinary skill in the art may understand that all or a part of the steps of the foregoing embodiments may be implemented through hardware, and may also be implemented by a program instructing relevant hardware. The program may be stored in a computer readable storage medium. The storage medium may be a read-only memory, a magnetic disk, or an optical disk, or the like.

The foregoing description is merely exemplary embodiments of the present invention, but is not intended to limit the present invention. Any modification, equivalent replacement, or improvement made within the spirit and principle of the present invention shall fall within the protection scope of the present invention.

What is claimed is:

1. A method for determining a fault indication state, comprising:
   receiving, at one service node in a service node pool, results collected by service request nodes indicating whether each service node in the service node pool is faulty; and
   determining, at the one service node, fault indication states of each of other service nodes in the pool according to the received results at the one service node such that for each of the other service nodes in the service node pool a fault indication state is (a) normal if there are no fault indications among the received results, (b) uncertain if part of the received results indicate that other service node is faulty, and (c) faulty if all of the received results indicate that other service node is faulty.

2. The method according to claim 1, wherein the receiving results collected by the service request nodes further comprises:
   receiving, during a current period, echo request messages transmitted by the service request nodes, wherein the echo request messages carry the received results collected by service request nodes during a previous period to the current period.

3. The method according to claim 1, further comprising: determining, at the one service node, a fault indication state of the service node itself according to the received results.

4. The method according to claim 3, wherein the determining the fault indication state of the service node itself comprises at least one of the following:
   if a result sent from at least one of the service request nodes and received in a current period indicates that the service node itself is normal, setting the fault indication state of the service node itself to normal; and
   if no result from any of the service request nodes is received in the current period, or if all of the results sent by the service request nodes and received in the current period indicate that the service node itself is faulty, setting the fault indication state of the service node itself to abnormal.

5. The method according to claim 3, further comprising:
   triggering network resource acquisition behavior and/or release behavior using the fault indication state of the service node itself as a primary state and the fault indication states of the other service nodes as auxiliary states.

6. The method according to claim 5, wherein the triggering network resource acquisition behavior and/or release behavior by using the fault indication state of the service node itself as a primary state and the fault indication states of the other service nodes as auxiliary states comprises at least one of the following:
   when the fault indication state of the service node itself changes from abnormal to normal, triggering, after a preset first protection duration, an operation of acquiring a network resource of the service node itself; when the fault indication state of the service node itself changes from normal to abnormal, triggering an operation of releasing a network resource of the service node itself, and completing release of the network resource of the service node itself within a preset second duration;
   when the fault indication state of the service node itself is normal, if a fault indication state of a service node D among the other service nodes changes from normal to faulty, triggering, after a preset third protection duration, an operation of acquiring a network resource of the service node D; and
   when the fault indication state of the service node itself is normal, if a fault indication state of a service node E among the other service nodes changes from faulty to normal or uncertain, triggering an operation of releasing a network resource of the service node E, and completing release of the network resource of the service node E within a preset fourth duration;
   wherein the first protection duration is greater than the fourth duration, and the third protection duration is greater than the second duration.

7. The method according to claim 1, wherein before the receiving results collected by the service request nodes, the method comprises:
   expanding, by the service request nodes, echo request messages, wherein the echo request messages carry the results collected by the service request nodes indicating, whether each service node in the service node pool is faulty during a previous period to a current period; and
   transmitting, by the service request nodes, the echo request messages to each service node in the service node pool at a beginning of the current period.

8. A method for determining a fault indication state, comprising:
   expanding, by one of a plurality of service request nodes, an echo request message, wherein the echo request message carries results collected by the service request nodes indicating whether each service node in a service node pool is faulty during a previous period to a current period; and
   transmitting, by the service request node, the echo request message to each service node in the service node pool at a beginning of the current period to enable each service node to determine fault indication states of each of other service nodes in the pool according to the received results at one service node such that for each of the other service nodes in the service node pool a fault indication state is (a) normal if there are no fault indications among the received results, (b) uncertain if part of the received results indicate that other service node is faulty, and (c) faulty if all of the received results indicate that other service node is faulty.

9. The method according to claim 8, wherein the expanding an echo request message comprises:
   utilizing idle bits of the echo request message, wherein each of the idle bits represents whether a service node in the service node pool is faulty;
   or, adding new bits in the echo request message, wherein each of the new bits represents whether a service node in the service node pool is faulty.

10. The method according to claim 8, further comprising:
    transmitting, by the service request node, the echo request message to each service node in the service node pool at the beginning of the current period to enable each service node to determine a fault indication state of the service node itself according to the results collected by the service request nodes.

11. A service node in a service node pool comprising:
a receiver, configured to receive results collected by service request nodes indicating whether each service node in the service node pool is faulty; and
a determiner, configured to determine fault indication states of each of other service nodes in the pool according to the received results at the service node such that for each of the other service nodes in the service node pool a fault indication state is (a) normal if there are no fault indications among the received results, (b) uncertain if part of the received results indicate that other service node is faulty, and (c) faulty if all of the received results indicate that other service node is faulty.

12. The service node according to claim 11, wherein the receiver is configured to:
receive, during a current period, echo request messages transmitted by the service request nodes, wherein the echo request messages carry the received results collected by service request nodes during a previous period to the current period.

13. The service node according to claim 11, wherein the determiner is further configured to: determine a fault indication state of the service node itself according to the received results.

14. The service node according to claim 13, wherein that the determiner to determining the fault indication state of the service node itself comprises at least one of the following:
if a result sent from at least one of the service request nodes and received in a current period indicates that the service node itself is normal, setting the fault indication state of the service node itself to normal; and
if no result from any of the service request nodes is received in the current period, or if all of the results sent by the service request nodes and received in the current period indicate that the service node itself is faulty, setting the fault indication state of the service node itself to abnormal.

15. The service node according to claim 13, wherein the service node further comprises:
a trigger, configured to, after the determiner is executed, trigger network resource acquisition behavior and/or release behavior by using the fault indication state of the service node itself as a primary state and the fault indication states of the other service nodes as auxiliary states.

16. The service node according to claim 15, wherein the trigger is configured to implement at least one of the following:
when the fault indication state of the service node itself changes from abnormal to normal, triggering, after a preset first protection duration, an operation of acquiring a network resource of the service node itself;
when the fault indication state of the service node itself changes from normal to abnormal, triggering an operation of releasing a network resource of the service node itself, and completing release of the network resource of the service node itself within a preset second duration;
when the fault indication state of the service node itself is normal, if a fault indication state of a service node D among the other service nodes changes from normal to faulty, triggering, after a preset third protection duration, an operation of acquiring a network resource of the service node D; and
when the fault indication state of the service node itself is normal, if a fault indication state of a service node E among the other service nodes changes from faulty to normal or uncertain, triggering an operation of releasing a network resource of the service node E, and completing release of the network resource of the service node E within a preset fourth duration;
wherein the first protection duration is greater than the fourth duration, and the third protection duration is greater than the second duration.

17. A service request node, comprising:
an expander, configured to expand an echo request message, wherein the echo request message carries results collected by service request nodes indicating whether each service node in a service node pool is faulty during a previous period to a current period; and
a transmitter, configured to transmit the echo request message to each service node in the service node pool at a beginning of the current period to enable each service node to determine fault indication states of each of other service nodes in the pool according to the received results at one service node such that for each of the other service nodes in the service node pool a fault indication state is (a) normal if there are no fault indications among the received results, (b) uncertain if part of the received results indicate that other service node is faulty, and (c) faulty if all of the received results indicate that other service node is faulty.

18. The service request node according to claim 17, wherein the expander is configured to:
utilize idle bits of the echo request message, wherein each of the idle bits represents whether a service node in the service node pool is faulty;
or, add new bits in the echo request message, wherein each of the new bits represents whether a service node in the service node pool is faulty.

19. The service request node according to claim 16, wherein the transmitter is further configured to: transmit the echo request message to each service node in the service node pool at the beginning of the current period to enable each service node to determine a fault indication state of the service node itself according to the results collected by the service request nodes.

20. A system for determining a fault indication state,
comprising a plurality of service request nodes and service nodes in a service node pool, wherein
each service request node comprises an expander and a transmitter:
the expander is configured to expand an echo request message, wherein the echo request message carries results collected by the service request nodes indicating whether each service node in the service node pool is faulty during a previous period to a current period; and
the transmitter is configured to transmit the echo request message to each of the service nodes in the service node pool at a beginning of the current period to enable each of the service nodes to determine a fault indication state of the service node itself and fault indication states of other service nodes according to the collected results;
each of the service nodes comprises a receiver and a determiner:
the receiver is configured to receive the echo request message transmitted by the service request node, wherein the echo request message carries the received results collected by the service request nodes indicating whether each of the service nodes in the service node pool is faulty during the previous period to the current period; and the determiner is configured to determine the fault indication state of the service node itself and fault indication states of each of the other service nodes in the pool according to the received results at the one service node such that for each of the other service nodes in the service node pool a fault indication state is (a) normal if there are no fault indications among the received results, (b) uncertain if part of the received results indicate that other service node is faulty, and (c) faulty if all of the received results indicate that other service node is faulty.

\* \* \* \* \*